United States Patent [19]

Dasher et al.

[11] Patent Number: 5,312,689
[45] Date of Patent: May 17, 1994

[54] LAMINATED OPHTHALMIC LENS

[75] Inventors: David Dasher; E. Robert Fretz, Jr.; Mark S. Friske, all of Corning, N.Y.; Ronald E. Johnson, Tioga, Pa.

[73] Assignee: Corning Incorporated, Corning, N.Y.

[21] Appl. No.: 20,424

[22] Filed: Feb. 22, 1993

[51] Int. Cl.⁵ .............................................. B32B 27/38
[52] U.S. Cl. ........................................ 428/413; 156/99; 156/245; 156/327; 264/1.7; 428/424.2; 428/500
[58] Field of Search ................ 156/245, 99, 327; 264/1.7, 1.8; 428/413, 424.2, 500

[56] References Cited

U.S. PATENT DOCUMENTS

| | | | |
|---|---|---|---|
| 3,833,289 | 9/1974 | Schuler | 350/155 |
| 4,564,408 | 1/1986 | Crumback et al. | 264/1.7 |
| 4,657,354 | 4/1987 | Kobayashi | 264/1.7 |
| 4,883,548 | 11/1989 | Onoki | 264/1.8 |
| 4,936,936 | 6/1990 | Rohrbacher | 156/245 |
| 4,978,405 | 12/1990 | Hickman | 156/245 |
| 5,034,275 | 7/1991 | Pearson et al. | 428/424.2 |
| 5,096,626 | 3/1992 | Takamizawa et al. | 264/1.7 |
| 5,102,722 | 4/1992 | Iida et al. | 428/413 |
| 5,116,684 | 5/1992 | Fretz, Jr. et al. | 264/1.7 |
| 5,118,372 | 6/1992 | Spahn | 156/245 |
| 5,160,668 | 11/1992 | Imus | 264/1.7 |
| 5,175,047 | 12/1992 | McKenney et al. | 428/413 |
| 5,200,253 | 4/1993 | Yamaguchi et al. | 264/1.7 |
| 5,219,497 | 6/1993 | Blum | 264/1.7 |
| 5,232,637 | 8/1993 | Dasher et al. | 264/1.7 |

Primary Examiner—John T. Kwon
Attorney, Agent, or Firm—Milton M. Peterson; Clinton S. Janes, Jr.

[57] ABSTRACT

An improved, laminated, ophthalmic lens structure, and method of producing the structure. The structure comprises two adjacent layers of dissimilar, organic plastic materials, either or both of which contain matter that tends to migrate. The improvement comprises a barrier layer that is intermediate the adjacent organic plastic layers; that is impermeable to migrating matter; and that is composed of a polyolefin polymeric material modified by the presence of acid or anhydride functional groups.

11 Claims, 1 Drawing Sheet

LAMINATED OPHTHALMIC LENS

FIELD OF THE INVENTION

The field is laminated, ophthalmic lens structures embodying two dissimilar, organic plastic materials.

BACKGROUND OF THE INVENTION

The present invention relates to an ophthalmic lens structure embodying two adjacent layers of dissimilar, organic plastic materials. It further relates to problems that arise in producing such structures. More particularly, the problems tend to arise when at least one of the materials is present in monomeric form, and must be cured in situ.

One such lens structure is described in U.S. Pat. No. 5,232,637 (Dasher et al.). That patent describes a method of producing a glass-plastic, laminated, ophthalmic lens structure. The method comprises applying an organic plastic adhesive layer, for example, a thermoplastic urethane, to a glass lens element which is then inserted in a mold. Thereafter, a monomeric formulation, which may for example be an epoxy formulation, is flowed onto the adhesive layer and cured in situ to form a laminated lens blank. In the course of developing this method, it was discovered that certain deleterious changes could develop in the organic materials during the curing process. These changes were manifested as striae and/or low adhesive strength.

Other situations where the potential exists for similar problems to arise are disclosed in U.S. Pat. No. 5,223,862 (Dasher et al.) and No. 5,254,000 (Friske et al.).

The former application describes forming a segment member composed of an organic material. The segment is formed in a countersink in the surface of an organic lens member. The resulting composite may, in turn be adhered to a thin glass lens member. The latter patent describes production of an organic lens wherein an organic monomer is cast and cured in a plastic mold. The mold may, for example, be composed of a polyolefin plastic material. The lens material cast in the mold may be an epoxide, or an allylic carbonate, in monomeric form. In each of these situations, as well as others that will become apparent, there is a structure wherein layers of adjacent, dissimilar organic materials are present. Further, at least one of the materials may be cured under thermal influence in producing a final product. Thus, the potential for defect development exists in these structures as well.

It is then a basic purpose of the present invention to provide a solution to this problem of defects. It is a further purpose to provide an improved, laminated, ophthalmic lens structure embodying two adjacent layers of dissimilar organic materials. Another purpose is to provide an improved method of producing such a structure wherein at least one of the materials must be thermally cured in situ.

SUMMARY OF THE INVENTION

The article of our invention resides in an improved, laminated, ophthalmic lens structure comprising two adjacent layers of dissimilar, organic plastic materials, either or both of which contain matter that tends to migrate, the improvement comprising a barrier layer that is intermediate to the adjacent layers, that is impermeable to the migratory matter, and that is composed of a polyolefin polymeric material modified by the presence of acid or anhydride functional groups. In a preferred embodiment, the two adjacent layers of dissimilar organic plastic materials are a rigid, organic plastic element and a flexible, adhesive element with the option of the flexible adhesive material being adhered to a thin glass lens element to form a glass-plastic, laminated, ophthalmic lens structure.

The invention further resides in the improved production of an ophthalmic lens structure wherein at least one organic, monomeric material is cured adjacent to a layer of dissimilar organic material, wherein either or both of the organic materials contain matter that tends to migrate, the improvement comprising applying a barrier layer, intermediate the dissimilar organic materials, that is impermeable to the migratory matter, and that is composed of a polyolefin polymeric material modified by the presence of acid or anhydride functional groups.

PRIOR ART

Figure 1:
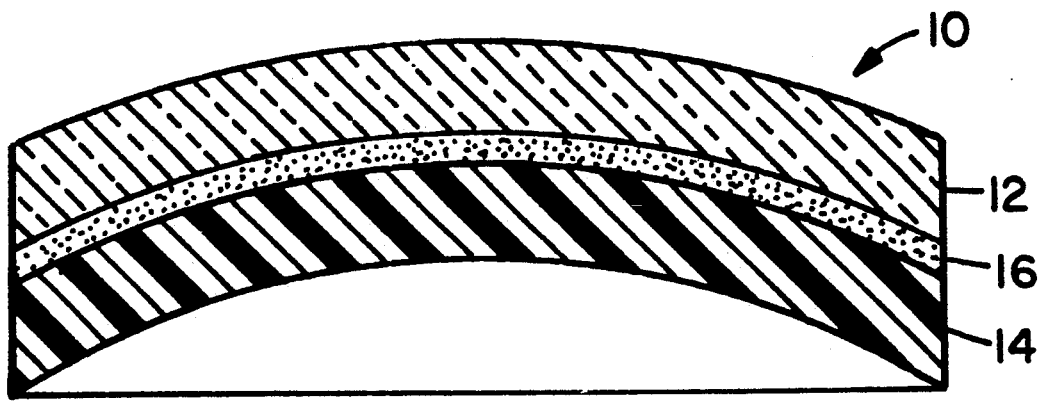
FIG. 1 is a side view in cross-section of a glass-plastic ophthalmic lens in accordance with the prior art.

In addition to the patents mentioned above, and the patents cited therein, attention is also directed to the following United States Patent:

U.S. Pat. No. 3,833,289 (Schuler) describes a composite light-polarizing lens comprising a light-polarizing element having coated on each surface thereof a layer which enhances adhesion between in situ formed lens components and inhibits migration of lens constituents between said light-polarizing elements and said in situ polymerized components during formation of the lens.

DESCRIPTION OF THE INVENTION

The need for the present invention arose when an attempt was made to develop the inventive method described in U.S. Pat. No. 5,232,637, supra. In that operation, a thin glass lens, having a thermoplastic urethane adhesive layer applied over one surface, was inserted in a cylindrical gasket mold. A monomeric epoxy formulation was poured over the adhesive layer to fill the mold. This assembly was then subjected to a thermal cycle to cure the epoxy formulation to a rigid plastic lens element.

Inspection of the glass-plastic, laminated, lenses thus produced revealed that a surprising number had imperfections that would require rejection. These imperfections were manifested in two different ways. One condition manifested itself in the form of striations, or streaks, in the epoxy lens element, that were visually apparent. Another condition became apparent as inadequate strength when the lenses were subjected to standard stress testing procedures.

These imperfections led to careful study of both the test samples and the lens production procedure. The studies revealed that the deleterious conditions arose from migration of material components between the epoxy and the urethane layers during the curing operation. In particular, it was found that unreacted components in the epoxy formulation, primarily anhydride from the curing agent, could migrate into the urethane layer. This effected property changes in both the cured epoxide and the urethane.

The urethane layer was rendered weaker and less resistant to delamination, particularly at higher temperatures, due to the anhydride migration into it. This impacted the ability of the urethane to accommodate the stresses that are encountered in service by a laminated lens. Also, the epoxy stoichiometry is altered by loss of the anhydride during curing. This, in turn, alters the epoxy properties at the surface of the epoxy element.

It was further found that absorbed moisture in the urethane layer could migrate into the epoxy. This water could then interact with components in the epoxy, in particular the anhydride, to form an insoluble diacid. This, in turn, contributes to formation of the observed striations in the epoxy lens element.

Our invention then is predicated both on our discovery of the migration problem, and on our finding a solution to that problem. The solution involves placing a barrier layer between the urethane and the epoxy during casting and curing. The barrier layer chosen must, of course, be impermeable to the migrating components in order to be effective. Further, it must be essentially unreactive with either the urethane or the epoxy, must not embody migrating materials itself, and must exhibit good adhesion to the urethane and the epoxy.

Materials found capable of meeting these conditions may be defined as polyolefin polymeric materials modified by the presence of acid or anhydride functional groups. The functional groups may be provided through copolymerization of two or more monomeric polyolefin formulations. Alternatively, the acid or anhydride groups might be attached to the polyolefin by chemical reaction to provide a chemically modified olefin.

Polyolefins, for example, polyethylene and polypropylene, are polymers with excellent chemical resistance properties. However, it is inherently difficult to bond to polyolefins. Further, these materials are typically hazy or translucent even at the thicknesses proposed for the present barrier layers. This is because the polyolefins tend to form crystalline regions which scatter light.

Providing the polyolefins with acid or anhydride functional groups does not impair their ability to function as barrier layers. However, the acid or anhydride functionality in the modified polymer improves the adhesion characteristics of the material. Further, these functional groups decrease the tendency of the polyolefin polymer to form light scattering crystalline regions.

The functional groups may be provided by copolymerizing the polyolefin with acid or anhydride functional monomers. Such monomers include acrylic acid, methacrylic acid, or maleic anhydride. Alternatively, the polyolefin may be chemically modified by reaction with an acid or anhydride functional monomer, such as maleic anhydride. The latter procedure may employ a reactive extrusion process.

Polyolefin copolymers and terpolymers involving acid and/or anhydride groups are available commercially. Examples of suitable commercial materials are as follows:

Primacor(TM) ethylene-acrylic acid copolymers from Dow Chemical

Nucrel(TM) ethylene-methacrylic acid copolymers and ionomer derivatives from DuPont Fusabond(TM) maleic anhydride chemically modified polypropylene, linear low density polyethylene, and ethylene-vinyl acetate from DuPont Elvax(TM) terpolymers of acrylic acid, vinyl acetate, and ethylene from DuPont Polybond(TM) acrylic acid and maleic anhydride chemically modified polypropylene and linear low density polyethylene from B.P. Chemicals Plexar(TM) acid and anhydride chemically modified polyethylene, polypropylene, linear low density polyethylene, and ethylene-vinyl acetate from Quantum-USI The best material for a given application must be determined by experimentation in order to determine the material best for all the required characteristics. For instance, there are several grades of one material available, where the difference between the grades is the ratio of ethylene to acrylic acid. A higher acrylic acid content will give better adhesion and optical characteristics, but worse chemical barrier performance.

Several different techniques are available for incorporating a barrier layer intermediate dissimilar organic plastic materials. One possible approach is to coextrude the barrier layer material with one of the dissimilar materials, for example, the thermoplastic urethane. This would produce a single extruded sheet that would incorporate both materials as distinct and separate layers. The coextruded sheet could then be handled and processed in the same manner as the thermoplastic urethane currently used in the direct cast process. This would permit incorporating the barrier layer into the direct cast process without adding process steps. However, care must be exercised to obtain good optical quality because of different rheologies in the materials.

An alternative process is to apply the barrier layer to the thermoplastic urethane using a compression molding process. The thermoplastic urethane is first applied to the glass cap; then the barrier layer is applied to the coated glass cap by the same process.

Another alternative process is to laminate together sheets of thermoplastic urethane and barrier layer material. This laminated film is applied to the glass using pressure. The lamination of the films to one another can be done using pressure and may require heat. We have used this process for current evaluations of barrier layer materials. This process has a potential for contamination which requires care. There is also a potential for air entrapment between the sheets. However, this may be avoided by using a roll laminator.

Yet another possible process would require that the barrier material be applied to an extruded thermoplastic urethane film by an extrusion coating or slot orifice coating technique. Each of the alternative processes is less desirable inasmuch as process steps are added and the risk of contamination is increased in each.

The organic plastic materials isolated from each other may be any dissimilar materials, at least one of which requires curing, and at least one of which contains potentially migratory material. While not necessarily so limited, the invention has been developed for a laminated lens embodying a thermoplastic organic in combination with a thermosetting organic. The two are separated from each other by a barrier layer.

The thermosetting plastic is preferably an epoxy, but may also be a urethane, or an allylic resin, such as the widely used CR-39(TM) resin. The thermoplastic organic is preferably a urethane, but other materials, such as polyvinyl butyral, are also contemplated.

Figure 2:
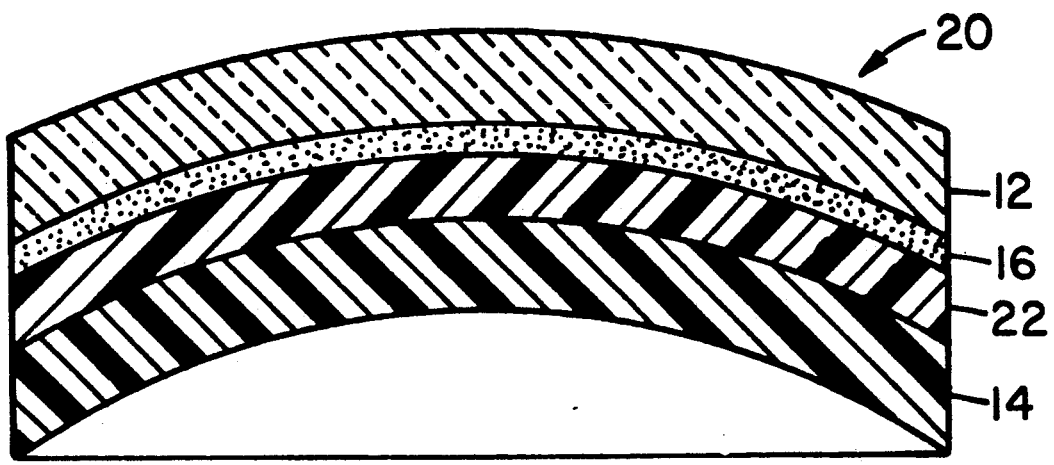
FIG. 2 is a side view in cross-section of a glass-plastic ophthalmic lens in accordance with the present invention.

The invention is further illustrated with reference to the drawing FIGS. 1 and 2 depict a comparison of a prior art, laminated, glass-plastic ophthalmic lens with the same lens as produced in accordance with the present invention. FIGS. 1 and 2 are side views in cross section of the lenses being compared. In FIG. 1, prior art lens 10 comprises a thin glass lens element 12, which may, for example, have a thickness of about 1 mm. Lens 10 further comprises a plastic lens element 14, which may be a cured epoxy of somewhat greater thickness than glass element 12. Intermediate elements 12 and 14 is an adhesive interlayer 16 which may be a sheet of thermoplastic urethane on the order of 0.005 to 0.025 inches (0.13 to 0.63 mm) thick.

Laminated lens 20 of FIG. 2 is essentially a duplicate of that shown in FIG. 1, except for barrier layer 22 intermediate adhesive interlayer 16 and plastic lens element 14. Barrier layer 22 is very thin, preferably on the order of 0.0005 to 0.005 inches (0.013 to 0.13 mm) in thickness. As noted earlier, barrier layer 22 must be impermeable to potentially migrating matter from either plastic lens element 14 or adhesive interlayer 16. Further, it must be adherent to each element and nonreactive therewith. It must also be optically clear, which means free from color and from any light scattering inclusions, such as bubbles or crystallites.

In a currently preferred embodiment, we employ an ethylene-acrylic acid copolymer as a barrier layer. This material has an acrylic acid content of about 9.5%, and is supplied by Dow Chemical under the designation Primacor ® 1420. The material is applied as a laminated sheet with a thermoplastic urethane. The barrier layer is about 0.001 inches (0.03 mm) thick and the urethane layer is about 0.013 inches (0.33 mm) thick.

Primacor ® 1420 is one member in a series of materials having varying acrylic acid contents. We have found that materials in this series having greater acrylic acid contents do not provide as effective a barrier to migration. Materials with lower acid contents tend to develop haze and exhibit lower adhesion.

We claim:

1. In an improved, laminated, ophthalmic lens structure comprising two adjacent layers of dissimilar, organic plastic materials, at least one of which contains matter that tends to migrate, the improvement comprising a barrier layer that is intermediate the adjacent layers, that is impermeable to the migratory matter, and that is composed of a polyolefin containing a functional group selected from a group composed of acid or anhydride groups.

2. A lens structure in accordance with claim 1 wherein one adjacent layer of material is a thermoplastic and the other is a thermosetting organic.

3. A lens structure in accordance with claim 2 wherein the thermoplastic is a urethane.

4. A lens structure in accordance with claim 2 wherein the thermosetting organic is an epoxide.

5. A lens structure in accordance with claim 1 wherein the barrier layer is 0.0005 to 0.005 (0.013 to 0.13 mm) thick.

6. A lens structure in accordance with claim 1 that is a glass-plastic, laminated, ophthalmic lens structure wherein the two adjacent layers are a rigid, organic plastic lens element and a flexible, adhesive layer that is adhered to a thin glass lens element.

7. In the production of an ophthalmic lens structure wherein at least one organic monomeric material is cured adjacent to a layer of dissimilar organic material, wherein at least one of the organic materials contains matter that tends to migrate, the improvement that comprises applying a barrier layer, intermediate the dissimilar organic materials, that is impermeable to the migratory matter, and that is composed of a polyolefin containing a functional group selected from a group composed of acid and anhydride groups.

8. A method in accordance with claim 7, wherein one adjacent layer of material is a thermoplastic material and the other is a thermosetting organic.

9. A method in accordance with claim 7 wherein the at least one organic material being cured is an epoxy formulation.

10. A method in accordance with claim 7 wherein the barrier layer is of at least a thickness sufficient to prevent migration of material between the two organic materials.

11. A method in accordance with claim 10 wherein the thickness of the barrier layer is 0.0005 to 0.005 inches (0.013 to 0.13 mm).

* * * * *